United States Patent [15] 3,658,501
Lawrenson et al. [45] Apr. 25, 1972

[54] METHOD AND APPARATUS FOR MANUFACTURE OF FLOAT GLASS

[72] Inventors: Jack Lawrenson, Windle, St. Helens; Albert Sidney Robinson, Birkdale, Southport, both of England

[73] Assignee: Pilkington Brothers Limited, Liverpool, England

[22] Filed: Mar. 25, 1969

[21] Appl. No.: 810,248

[30] Foreign Application Priority Data

Apr. 9, 1968 Great Britain......................17,077/68

[52] U.S. Cl..................................65/30, 65/99 A, 65/182 R
[51] Int. Cl. .....................................C03c 17/00, C03b 19/02
[58] Field of Search......................65/99, 182, 101, 30, 99 A, 65/182 R; 204/224, 196, 225

[56] References Cited

UNITED STATES PATENTS

| 1,422,036 | 7/1922 | Crowley et al. | 65/101 X |
| 1,447,647 | 3/1923 | Crowley et al. | 65/182 X |
| 3,108,939 | 9/1963 | Sabins | 204/196 |
| 3,467,508 | 9/1969 | Loukes et al. | 65/99 X |
| 3,476,676 | 11/1969 | Johnson | 204/224 X |

Primary Examiner—S. Leon Bashore
Assistant Examiner—Robert L. Lindsay, Jr.
Attorney—Morrison, Kennedy & Campbell

[57] ABSTRACT

Float glass is manufactured with predetermined characteristics imparted to the glass by a body of molten material which contacts a surface of the glass and the length of the body of molten material, in the direction of relative movement between the glass and the body, is maintained constant in any section through the body in that direction. This is accomplished by forming the downstream portion of the locating member as an element which is movable with respect to an upstream portion of the locating member to compensate for different rates of erosion thereof. Alternatively, the downstream portion is formed of a material which is more erosion resistant than upstream portions of the locating member. In a further embodiment, the entire lower surface of the locating member is made movable with respect to the upper portion so as to enable the entire lower surface to be renewed.

10 Claims, 24 Drawing Figures

Patented April 25, 1972

Inventors
JACK LAWRENSON and
ALBERT SIDNEY ROBINSON
By
Morrison, Kennedy & Campbell
Attorneys

*Inventors*
JACK LAWRENSON and
ALBERT SIDNEY ROBINSON

Patented April 25, 1972

Inventors
JACK LAWRENSON and
ALBERT SIDNEY ROBINSON
By
Morrison, Kennedy & Campbell
Attorneys Patented April 25, 1972 3,658,501

Inventors
JACK LAWRENSON and
ALBERT SIDNEY ROBINSON
By
Morrison, Kennedy & Campbell
Attorneys

Patented April 25, 1972

Inventors
JACK LAWRENSON and
ALBERT SIDNEY ROBINSON
By
Morrison, Kennedy & Campbell
Attorneys Inventors
JACK LAWRENSON and
ALBERT SIDNEY ROBINSON

METHOD AND APPARATUS FOR MANUFACTURE OF FLOAT GLASS

BACKGROUND OF THE INVENTION

This invention relates to the manufacture of glass, and more especially the invention concerns processes and apparatus for producing glass in which predetermined characteristics are imparted to the glass by migration of an element or elements into the glass from a body of molten material which is held in contact with the surface of the glass.

In such processes the body of molten material may be a molten metal or molten alloy which clings to a locating member positioned adjacent the glass surface. Relative movement is effected between the glass and the locating member, and the molten body is maintained in position by clinging to the locating member. The migration of the element or elements into the glass from the body is controlled, for example, by regulating the oxidizing conditions at the interface between the glass and the body as described and claimed in co-pending application Ser. No. 765,428 filed 7 Oct. 1968. Alternatively, an electrolytic method may be used, in which the locating member acts as an electrode and current is passed through the glass (which is electrically conductive at the elevated temperatures of treatment) from the molten body to effect controlled migration of an element or elements from the molten body into the glass.

As the treatment process proceeds, material from the locating member is under certain conditions dissolved by the molten body, resulting in an appearance of wear of the lower part of the locating member.

It is a main object of the present invention to maintain a desired uniformity of characteristic in the treated glass by maintaining constant the intensity of treatment of each part of the glass throughout a manufacturing run of the process.

SUMMARY

According to the invention there is provided a method of producing glass in which predetermined characteristics are imparted to the glass from a body of molten material which contacts a surface of the glass and which clings to a locating member positioned adjacent said glass surface, and in which relative movement is effected between the glass and the locating member, characterized by maintaining constant the length of the body of molten material in the direction of relative movement in any section through the body in that direction.

It has been found that parts of the locating member to which the molten body clings are more susceptible to wear than the rest of the locating member. Wear has been found at the front and rear faces of the lower part of the locating member. In a preferred embodiment of the invention this wear is obviated by providing that at least one edge portion of the locating member, to which an edge of the molten body extending transversely of the direction of relative movement clings, is formed of a material which is more resistant to wear by the material of the molten body than the remainder of the locating member.

In an alternative method according to the invention, at least a part of the locating member, to which an edge of the molten body extending transversely of the direction of relative movement clings, is continuously or intermittently replaced at a rate sufficient to compensate for any erosion of the locating member by the molten body at said edge.

Preferably the said edge of the body of molten material is that edge from which the treated glass emerges.

Further the invention provides a method of producing float glass having predetermined characteristics in which glass in ribbon form is advanced along a bath of molten metal and characteristics are imparted to the glass, different from those inherent in the method of forming the glass, from a body of molten material which is held in contact with the upper surface of the advancing ribbon by clinging to a locating member positioned just above the path of travel of the ribbon, characterized by stabilizing the location of the downstream edge of the molten body by renewing the downstream face of the locating member, to which face the molten material clings.

The invention also comprehends apparatus for producing glass having a predetermined characteristic imparted thereto from a body of molten material contacting a surface of the glass and clinging to a locating member positioned adjacent said glass surface, said apparatus including means for supporting the glass, and means for effecting relative movement between the glass and the molten body, characterized in that at least one edge of the locating member is constituted by a face of a wear-resistant material to which the molten material of the body clings.

In a preferred apparatus the locating member includes an insert of said wear-resistant material, to a face of which insert the molten material clings.

Further according to the invention the apparatus may be characterized by means for continuously or intermittently replacing at least that part of the locating member to which an edge of the molten body extending transversely of the direction of relative movement clings, so as to compensate for erosion of said part by the molten material.

Still further according to the invention the locating member may have an insert of a material which is wetted by the molten material, said insert being keyed into an elongated channel in the locating member so as to present a face to which said edge of the molten body clings, means being provided for continuously or intermittently feeding the insert material through the channel at a controlled rate to renew said face to which the molten body clings.

The insert may comprise a continuous strip of said material.

Alternatively, instead of providing an insert, the locating member may be keyed on an elongated support member for relative movement as a whole transversely of the direction of relative movement of the glass and the molten body, means being provided for continuously or intermittently feeding the entire locating member along the support member to renew the entire surface of the locating member which is wetted by the body of molten material.

The locating member may comprise a succession of juxtaposed blocks of a material which is wetted by the molten body.

In a further embodiment of the invention, the locating member may include an adjustable edge portion having a face to which said edge of the molten body clings, the edge portion is held by suspending means adjustable to lower the edge portion into the molten body, independently of the main part of the locating member and so as to renew the lower edge of said face to which the molten body clings.

According to a yet further embodiment of the invention, the locating member may have a surface of cylindrical form to which the body of molten material clings, the axis of said surface being transverse to the direction of relative movement of the glass and the molten body, and means being provided for effecting continuous or intermittent rotation of the locating member about said axis so as to replace continuously or intermittently that part of the said surface to which said edge of the molten body clings.

In apparatus according to the invention for effecting an electrolytic treatment of the glass, the locating member and the molten material are electrically conductive and electrical connections are made to the locating member and to the glass support means for passing electric current through the molten body and the glass to assist the migration of an element into the glass from the body of molten material.

The invention also includes apparatus for producing float glass having a predetermined characteristic different from the characteristics inherent in the method of forming the glass, comprising a tank structure containing a bath of molten metal over which a headspace is defined by a roof structure, and means for delivering glass to the bath at a controlled rate and advancing the glass in ribbon form along the bath, said locating member being mounted in the headspace above, just above the path of travel of the advancing ribbon of glass with the downstream edge of the locating member constituted by a face of a wear-resistant material to which the molten material of the body clings.

The invention also includes glass having predetermined characteristics produced by a method as hereinbefore described.

DESCRIPTION OF THE PREFERRED EMBODIMENTS

Figure 1:
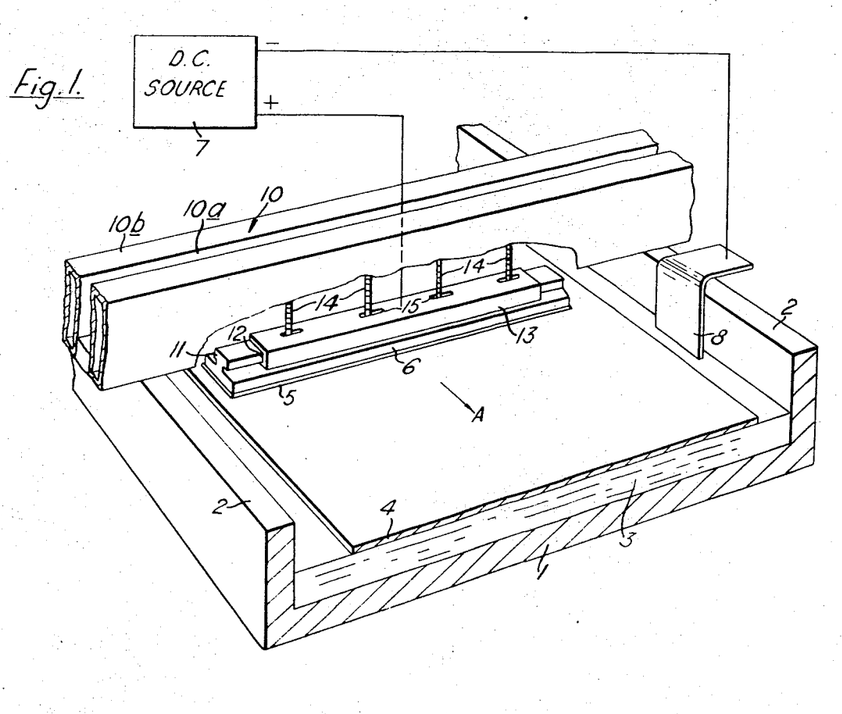
FIG. 1 is a diagrammatic partly cut-away perspective view of an apparatus for treating glass in sheet form to which the present invention is applicable.
Figure 2:
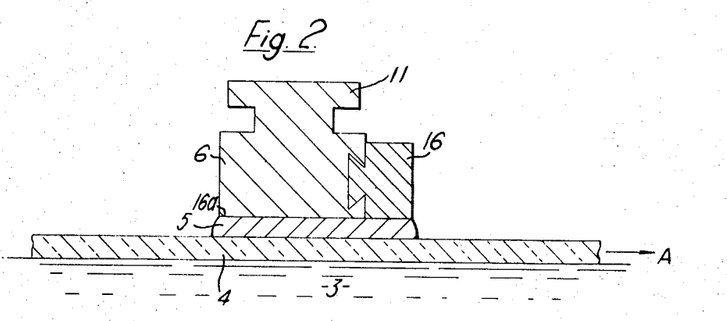
FIGS. 2 to 9 are diagrammatic cross-sectional views illustrating different examples of insert-reinforced locating members for use in apparatus according to one embodiment of the invention.
Figure 3:
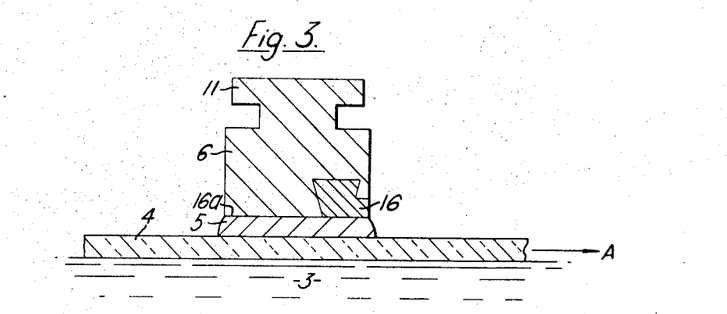

Soda-lime-silica glass, for example, is fed on to the bath 3 at a controlled rate, either as preformed ribbon of glass or as molten glass which is poured on to the bath at one end thereof and permitted to flow laterally unhindered to the limit of its free flow under the influence of surface tension and gravitational forces to form a flat ribbon 4 of glass which is advanced along the surface of the bath in the direction of arrow A.

The temperature of the glass ribbon 4 is regulated as the ribbon is advanced along the bath by means of controlled heaters (not shown) immersed in the bath 3 and located in the said headspace over the bath 3.

A body 5 of molten material for modifying the upper surface of the glass is maintained in contact with the upper face of the ribbon 4, the body 5 extending across the ribbon transversely of the direction of advance A thereof at a fixed station in the tank structure. The molten body 5, which does not wet the surface of the glass, is maintained in position by an elongated locating member 6 extending transversely across the ribbon 4 and parallel to the upper face thereof, so that a gap of uniform depth (for example, about 3 to 4 mm) is maintained between the lower surface of the member 6 and the upper face of the ribbon 4.

The molten material of the body 5 wets the lower surface or face of the locating member 6 and clings thereto, so that as the ribbon 4 passes continuously beneath the body 5, the latter is confined by the member 6 to the gap between the member 6 and the ribbon 4.

The molten material of the body 5 may comprise a metal, an alloy or a salt. For example, the material may be tin, lead, bismuth, antimony, indium, zinc, or thallium. Examples of suitable molten alloys are alloys of tin or lead or bismuth as a solvent metal with lithium, sodium, potassium, zinc, magnesium, copper, or silver as a solute metal. Sodium chloride is an example of a molten salt which may be used.

The locating member 6 may be of an unreactive metal, for example, one of the platinum group metals. Alternatively, the member 6 may comprise a base of, for example, copper, silver, brass, steel, alloys, containing copper or silver, or a refractory material having a coating of an unreactive metal such as, for example, ruthenium.

As the glass ribbon 4 passes beneath the molten body, its surface is modified by migration of one or more elements from the body 5 into the glass surface.

In a preferred electrolytic process the migration is controlled by passing a regulated electric current through the body 5 and the ribbon 4 to cause transfer of ions from the body 5 into the glass. For this purpose the locating member 6 is electrically conductive and is connected to the positive terminal of a direct current supply source 7 so that the molten body 5 acts as an anode and the bath 3 as a cathode of an electrolytic circuit, the glass of the ribbon 4 being the electrolyte. A negative electrode 8 connected to the negative terminal of the source 7 is immersed in the molten metal bath 3 on one side of the ribbon 4.

The surface modification of the glass ribbon 4 may alternatively be regulated by controlling oxidizing conditions in the body 5 so as to regulate the migration of an element or elements from the body 5 into the glass.

A supply duct (not shown) is provided in the head-space adjacent the member 6 for replenishing the body 5 of molten material with the element (or elements) which migrates into the glass ribbon 4 in operation of the apparatus.

In order to ensure uniform surface treatment of the glass ribbon across its width, it is important to ensure that there is no variation in the size of the gap between the lower surface of the locating member 6 and the upper face of the ribbon 4 along the width of the ribbon. With this object in view the locating member 6 is supported from a rigid beam structure 10 extending transversely over the bath 3.

The beam structure 10 is shown partially broken-away in FIG. 1 for the sake of clarity. The beam structure 10 comprises two parallel juxtaposed box-section hollow beams 10a, 10b, through which a coolant fluid, conveniently water, is circulated so as to maintain the beam structure 10 at a temperature which is considerably lower than the temperature of the molten body 5 and locating member 6, which temperature is typically of the order of 700° C.

The locating member 6 comprises an elongated strip having a flat lower face, parallel to the surface of the ribbon 4 to which the molten body 5 clings. Along its upper surface the member 6 is provided with an elongated key 11 which fits into a keyway 12 provided in an elongated holder 13. In this way the member 6 is free to undergo thermal expansion relative to the holder 13 without restraint, and therefore without the occurrence of any deformation.

The holder 13 is suspended from the beam structure 10 by a plurality, (four in the illustrated example) of support members 14, each of which has enlarged T-shaped head which is located in longitudinally extending slots 15 provided in the upper surface of the holder 13. The spacing of the support members 14 along the holder 13 is so chosen that the natural bending of the holder and locating member 6 between adjacent support members 14 is less than an acceptable maximum. To compensate for the tendency of the supported holder 13 and locating member 6 to flex under gravity between the outer ends of the beam structure 10 at least the center ones of the support members 14 are made adjustable in length. For example, the support members 14 may comprise respective screw-jack devices. A linkage is preferably provided for permitting adjustment of the support members 14 from positions externally of the tank structure.

By suitably adjusting the support members 14 and end supports (not shown) for the beam structure 10 the height of the gap between the locating member 6 and the ribbon 4 can be maintained uniform within acceptable limits over the length of the member 6.

It will be appreciated that the molten material in the body 5 is not static in operation of the apparatus, even though the body 5 as a whole is held in the dame position by clinging to the locating member. Since the lower face of the molten body 5 is in contact with the upper surface of the advancing glass ribbon 4, material in the body 5 close to the ribbon 4 is carried along with the glass. A return flow in the opposite direction takes place in the molten material close to the lower face of the locating member 6 resulting in some wear of the locating member which in some instances is due to dissolving of the material of the locating member 6 into the molten body 5, for example when the molten body 5 is a copper-lead alloy and the locating member 6 is a copper bar. Any such wear of the bottom of the locating member is usually uneven.

In the course of time erosion of the trailing edge of the locating member 6 may locally increase the gap between the lower face of the member 6 and the upper face of the ribbon 4, to an extent such that the molten material can no longer remain in that part of the gap by surface tension. As a result, the molten body 5 may recede unevenly from the eroded edge of the locating member 6.

The present invention avoids any such difficulty by ensuring that the length of the molten body 5 in any section therethrough in the direction of glass advance is maintained substantially constant, so that the method can be used with reliable results with high rates of glass movement and with high currents.

At least the trailing edge portion of the locating member 6 is constituted by a face of wear-resistant material to which the molten material of the body clings, and as shown in FIGS. 2 to 9 the locating member 6 is provided with an insert 16 comprising a material which is more resistant to erosion than the main body of the locating member 6. For example, where the locating member 6 is of copper and the molten body 5 is a copper-lead alloy, the insert 16 may comprise iron, mild steel, or ruthenium, each of which has a low solubility in the molten material of the body 5 which wets on to the insert.

Figure 4:
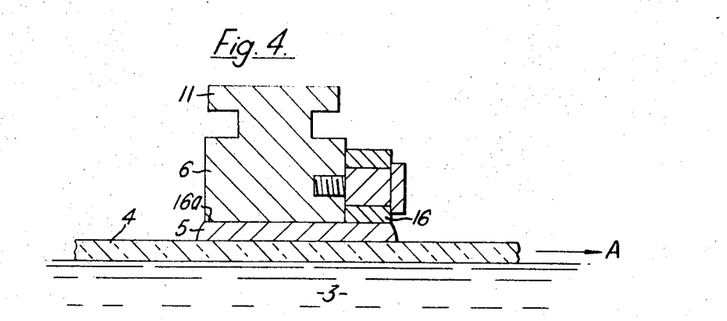
Figure 5:
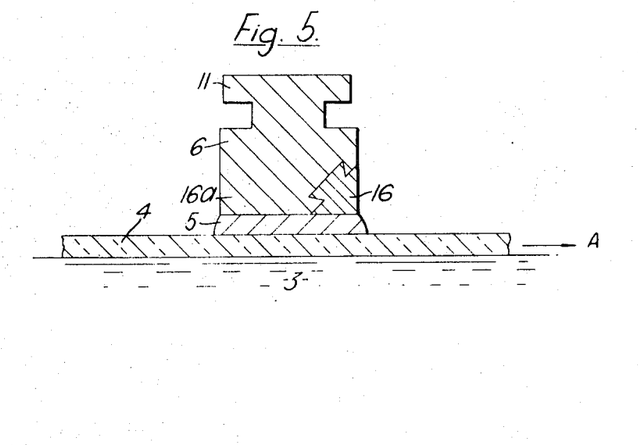
Figure 6:
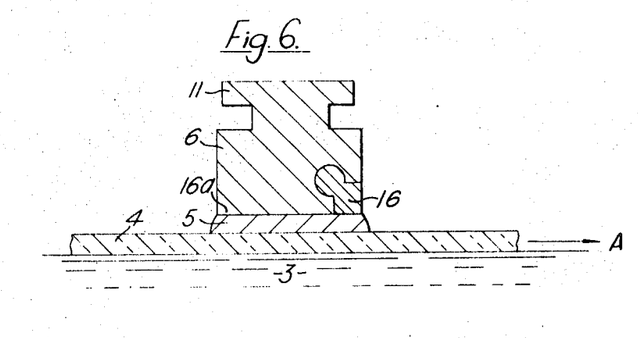
Figure 7:
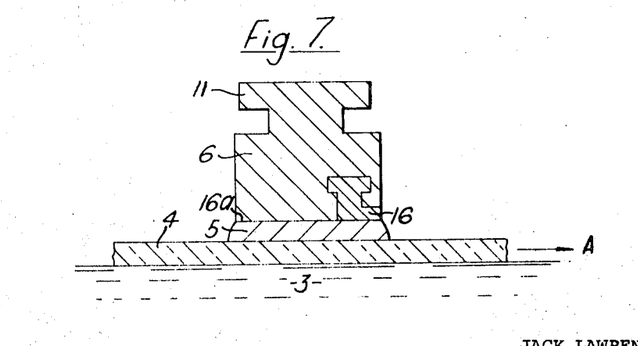
Figure 8:
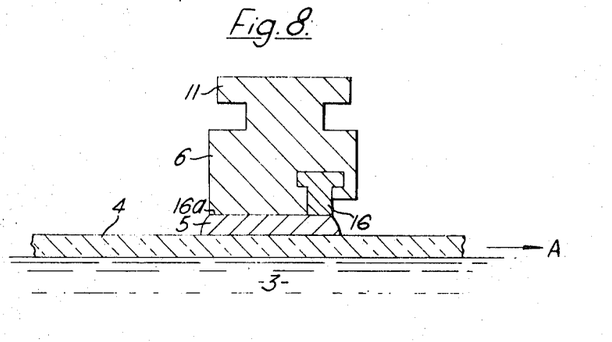

The insert 16 may be keyed into the locating member 6 as shown in FIGS. 2, 3 and 5 to 9, or secured thereto by means of bolts as in FIG. 4. To assist the initial wetting of the insert 16 by the molten body 5, the insert 16 may be provided with a thin coating of copper, for example by plating.

An insert 16 of porous refractory or porous graphite can conveniently be used when the molten body 5 is of molten lead or a lead alloy. The porosity of graphite causes lead to be absorbed, giving a "wetting" effect.

It has been found that the face of the locating member 6 may wear at its leading edge 16a at a greater rate than over its main wetted surface, although the rate of wear is not as great as that which occurs at the trailing edge. To avoid wear of the leading edge, it is also desirable to provide a further wear-resistant insert, similar to the insert 16 shown in FIGS. 2 to 9, along the leading edge 16a of the wetted face of the locating member 6.

Figure 9:
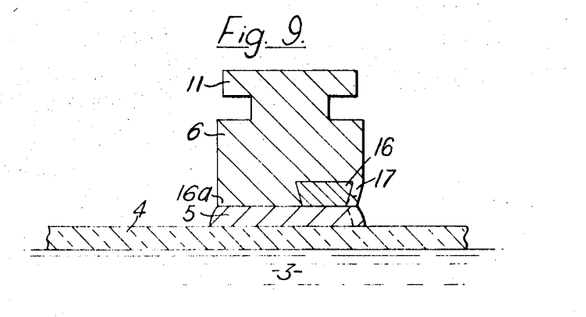

The arrangement of FIG. 9 is particularly suitable where the insert 16 is made of porous graphite. A thin lip 17 of the material of the locating member 6 (e.g., copper) extends initially along the trailing edge face of the member 6. This lip 17, which after a short period of operation is dissolved away to the limit shown in broken lines, and this assists the initial "wetting" of the trailing edge of the graphite insert 16. Thereafter the trailing edge of the molten body 5 clings to the trailing edge of the insert 16, as shown in broken lines.

Instead of an insert of a wear-resistant material, the edges of the locating member 6 may be plated so as to provide a wear-resistant face. For example a copper bar may have its edges plated with ruthenium.

Figures 10, 11:
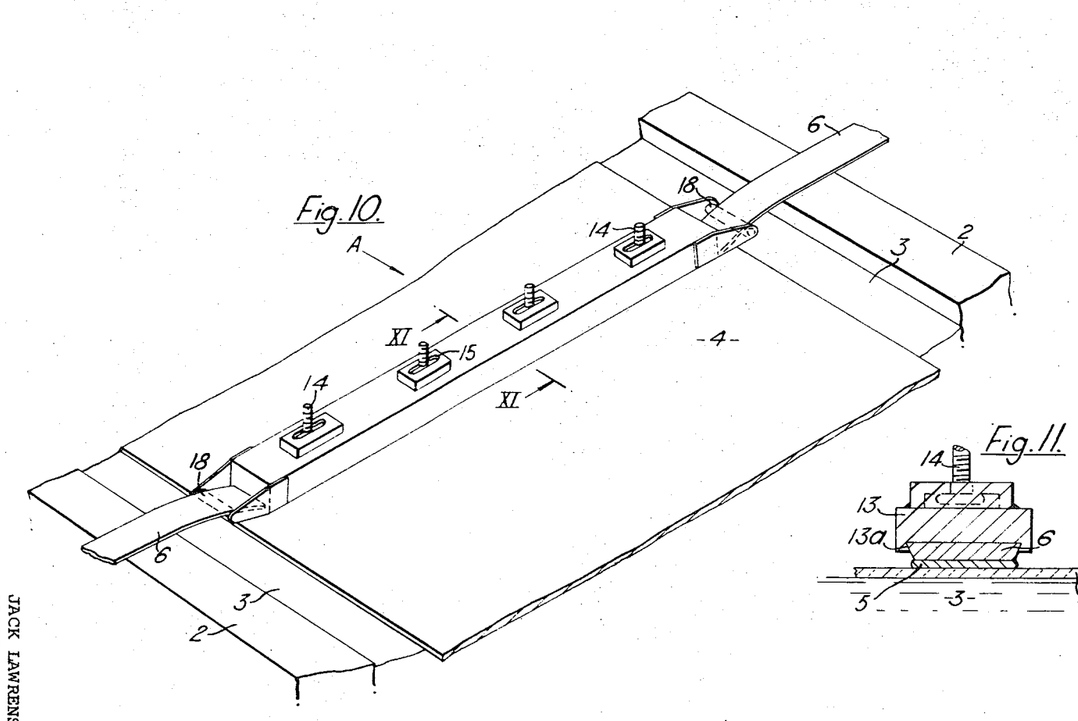
FIG. 10 is a diagrammatic perspective view of a modification of the invention which employs a replaceable locating member which can be moved continuously or intermittently.
FIG. 11 is a section on line X1 — X1 of FIG. 10.

The locating member 6 may be continuously replaced in another embodiment of the invention. FIGS. 10 and 11 illustrate one form of apparatus employing such an arrangement. The holder 13 is formed provided with a dovetail slot 13a in its lower face, in which slot a strip-like locating member 6, for example of extruded copper, is slidably fitted. The copper strip comprising the member 6 is in continuous form and is continuously fed into the holder 13 from one end thereof from a reel of the strip through one of the side walls 2 of the tank structure and is withdrawn from the holder 13 at the other end thereof through the other tank side wall 2. Guide rollers 18 are supported by the holder at the opposite ends thereof to bend the strip 16 as it is fed into and from the groove 13a and thereby ensure that the pool is contained within the confines of the edges of the ribbon. A typical rate of feed of the locating member strip is about 2.5 cm per minute, and when the ribbon of glass is 3 meters wide the locating member is completely replaced in 2 hours. In this time there has not been any appreciable wear of the strip.

Figures 12, 13:
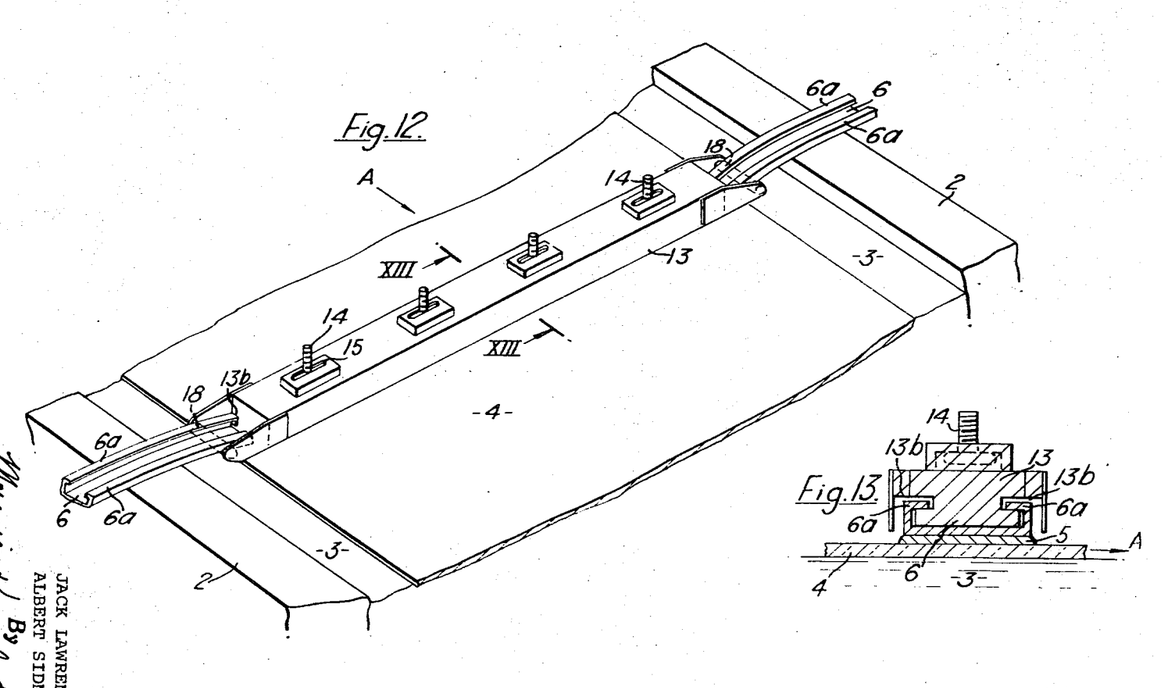
FIG. 12 is a view similar to FIG. 10 of another modified form of apparatus including a continuously replaceable locating member.
FIG. 13 is a section on line X111 — X111 of FIG. 12.

Instead of a continuously moving locating member 6, an intermittently moving member 6 may be employed. Also, instead of using a locating member 6 in the form of flat strip, a member in the form of continuous strip of partly closed channel section may be used, as illustrated in FIGS. 12 and 13. In this modification the inwardly-turned edges 6a of the channel-section strip constituting the locating member 6 are slidably received in respective slots 13b in the side faces of the holder 13.

Figure 14:
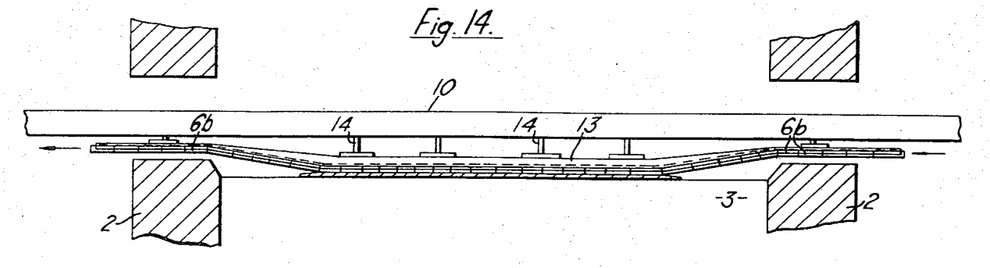
FIG. 14 is a diagrammatic part-sectional elevation of an apparatus according to a further embodiment of the invention in which the locating member is constituted by a series of movable blocks.
Figure 15:
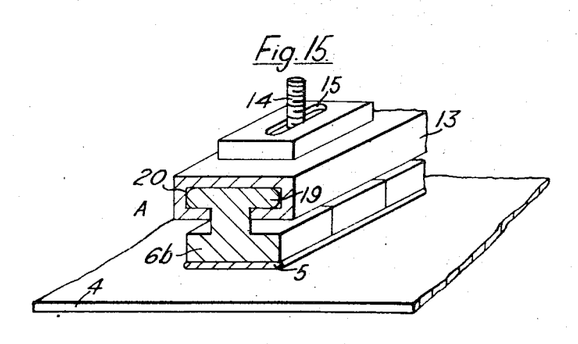
FIG. 15 is a partly sectioned perspective view of part of the locating member in the apparatus of FIG. 14.

FIGS. 14 and 15 show a further modification in which the replaceable locating member 6, instead of being continuous, comprises a succession of juxtaposed blocks 6b, for example of copper. In the illustrated example each block 6b has an integral T-shaped head 19 and the heads 19 of the blocks 6b slide in an elongated keyway 20 formed in a channel-section holder 13. The blocks 6' are advanced at a steady rate, for example 2.5 cm per minute, along the holder 13 through the side walls 2 of the tank structure by means of the ramped shape of the holder 13 illustrated in FIG. 14.

Figures 16, 17:
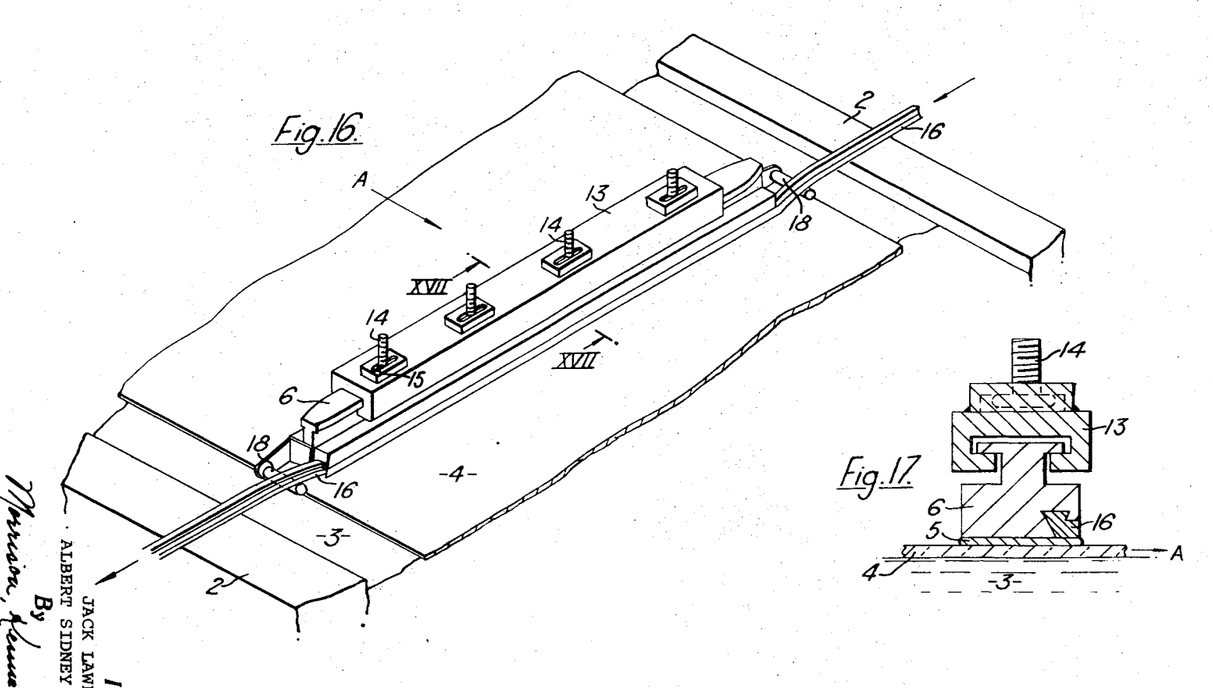
FIG. 16 is a diagrammatic perspective view of part of an apparatus according to a further embodiment of the invention having a locating member with a continuously renewable insert.
FIG. 17 is a cross-sectional view on line XV11 — XV11 of FIG. 16.
Figure 18:
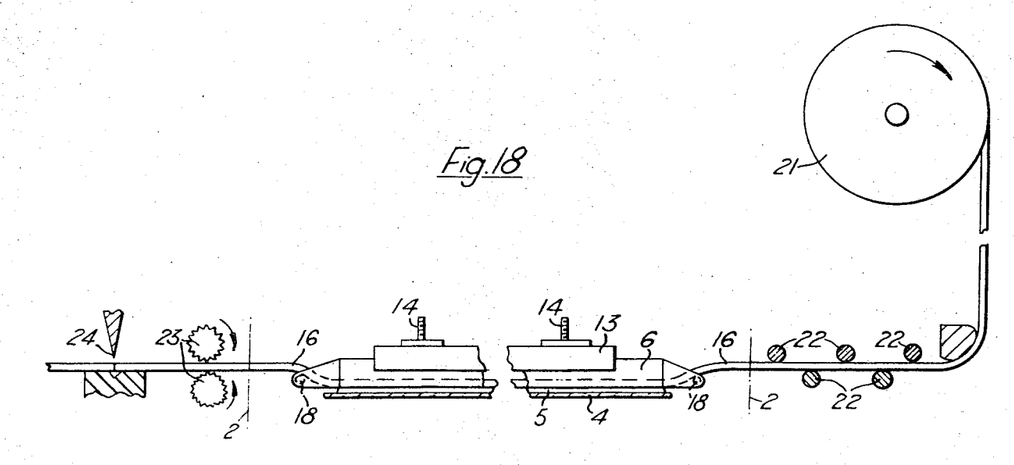
FIG. 18 is a diagrammatic elevation illustrating a feeding arrangement for the locating member insert in the apparatus of FIGS. 16 and 17, FIGS. 19 and 20 are diagrammatic perspective views of two further forms of locating member with a vertically adjustable face at the trailing edge of the locating member.

As an alternative to continuously or intermittently replacing the entire locating member 6, the trailing edge portion only, may be replaced as a continuously or intermittently movable insert, of the same material as the main part of the locating member. Such an arrangement is illustrated in FIGS. 16, 17 and 18. The locating member 6 is fitted with a dovetailed insert 16, shaped similarly to that illustrated in FIG. 3. The insert 16 is slidable in the member 6, and is moved continuously (or intermittently) along the member 6 through the opposite side walls 2 of the tank structure.

With a locating member 6 of copper the insert 16 is an extruded copper strip which is fed continuously from a supply reel 21 (FIG. 18) which may conveniently hold a 100-foot length of strip, and is passed between a plurality of straightening rollers 22 outside the tank structure before being drawn into the bath headspace. The strip is drawn through the rollers 22 and the locating member 6 at a controllable feed rate of, for example, 1 cm to 5 cm per minute, by traction applied to the strip leaving the tank structure, by a pair of toothed drive rollers 23 engaging the strip externally of the other tank side wall 3.

After passing through the drive rollers 23 the used strip is cut up by a guillotine 24 into short sections which are convenient to handle for remelting. Alternatively, the used strip may be wound up on a collecting drum.

A similar moving insert may be provided along the upstream edge of the locating member.

Figures 19, 20:
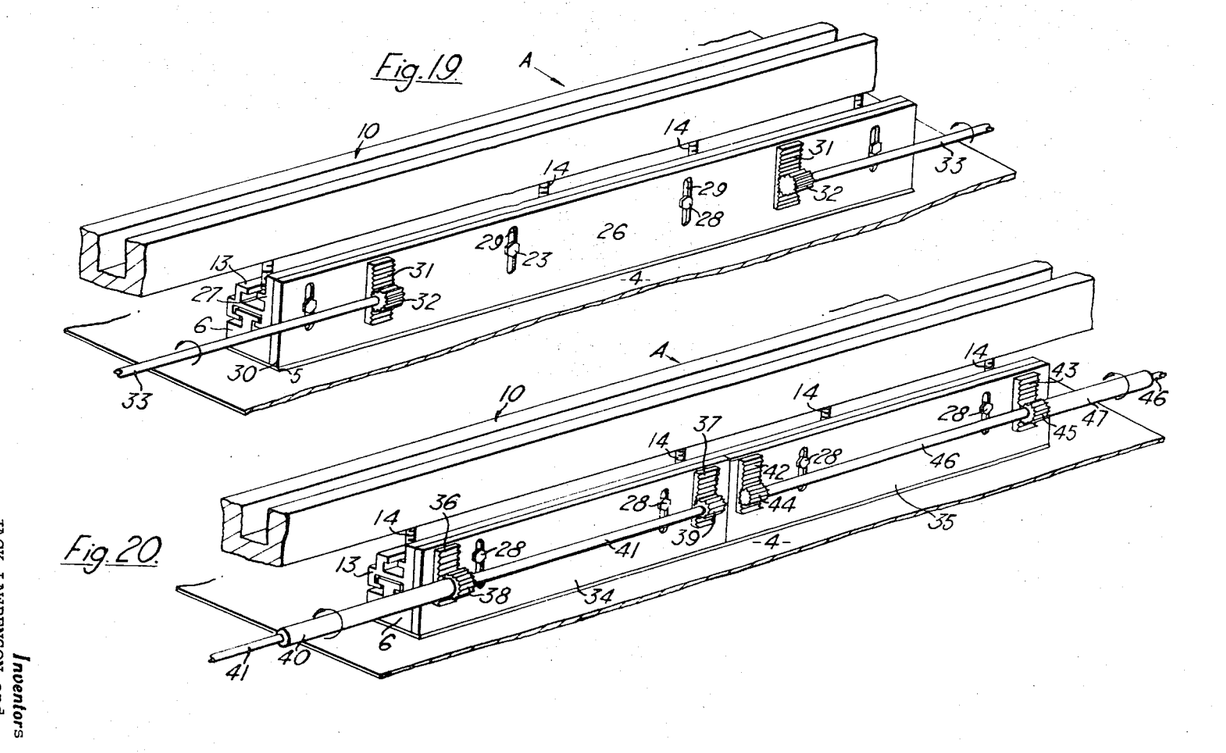

FIG. 19 illustrates an embodiment of the invention in which the face of the trailing or downstream edge portion of the locating member is renewed by the provision of a vertically adjustable trailing edge face plate 26 which is so arranged that it can be lowered continuously or intermittently to compensate for wear of the trailing edge. The face plate 26 is usually made of the same material as the main part of the locating member 6, e.g., both are of copper.

The face plate 26 is secured to a plane vertical wall 27 on the trailing side of the carrier 13 by means of a plurality of bolts 28. The bolts 28 are located in vertically elongated slots 29, in the face plate 26 so that the plate 26 is adjustable vertically relative to the carrier 13, that is, towards and away from the surface of the glass ribbon 4, to regulate the gap between the trailing edge 30 of the face plate 26 and the upper surface of the glass.

Vertical adjustment of the face plate 26 relative to the vertical wall 27 of the carrier 13 is effected so as to compensate for wear of the lower edge or face of the face plate in use of the apparatus, thereby ensuring that the location of the trailing edge of the molten body 5 is maintained. As illustrated, two racks 31 engaged by pinions 32 are fixed to the face plate 26 adjacent the outer ends of the face plate. The pinions 32 are fixed to the respective ends of drive shafts 33 which extend outwardly through the opposite side walls 2 of the tank structure. The drive shafts are operated in unison to lower the plate 26 so as to maintain the lower edge of the face plate at a desired distance above the glass whereby the molten body always clings to the face plate and the width of the molten body is preserved.

In a typical apparatus according to this embodiment the face plate 26 is about 6 mm thick, and the total capacity for vertical adjustment of the face plate 26 is approximately 2 cm.

FIG. 20 shows a modification of this embodiment in which the face plate which is vertically adjustable against the trailing edge of the locating member is formed in two halves indicated at 34 and 35, each extending across a respective half of the ribbon 4.

Two racks 36 and 37 are fixed to the half-plate 34 near its ends and these racks are engaged by pinions 38 and 39 which are respectively fixed co-axial shafts 40 and 41 which pass through one of the tank side walls 2.

The other half-plate 35 has two racks 42 and 43 fixed to it, which racks are engaged by pinions 44 and 45 mounted on co-axial shafts 46 and 47 which extend through the other tank side wall. By this arrangement the two halves 34 and 35 of the face plate can be raised and lowered independently to compensate for uneven wear of the edge portion. The independent operation of the pinions also permits slight angular adjustment of the half plates.

Figures 21, 22:
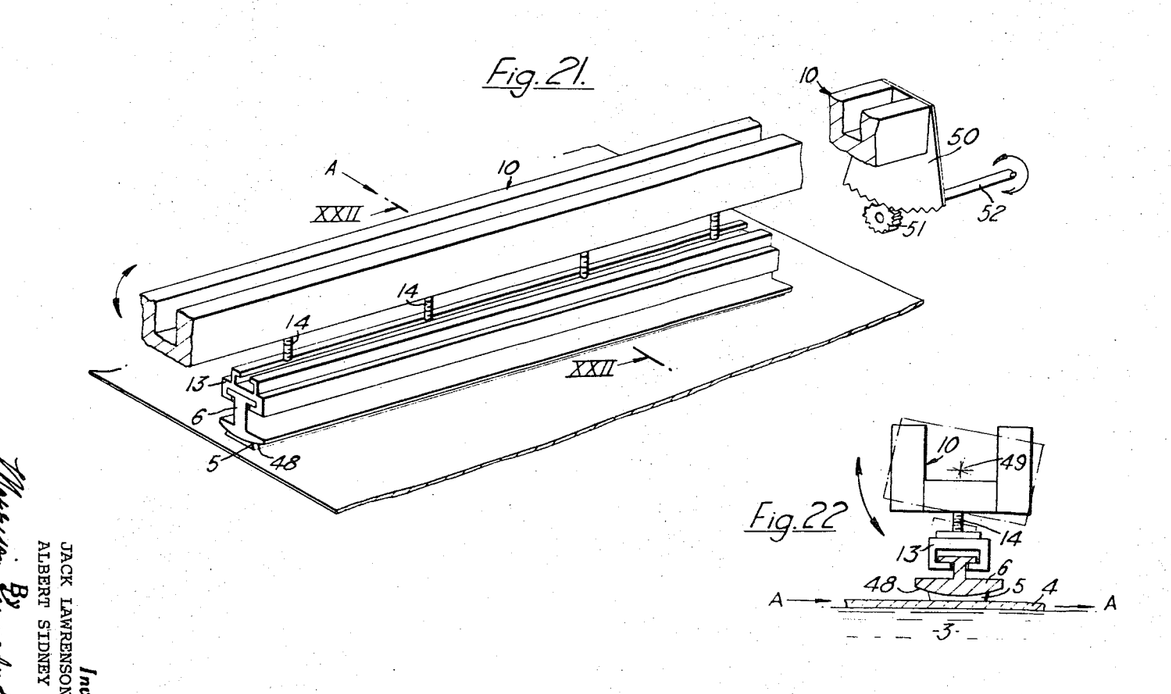
FIG. 21 is a diagrammatic perspective view of a form of locating member in accordance with a further embodiment of the invention, in which the locating member is rotatable about a transverse axis.
FIG. 22 is cross-sectional views on lines XX11 — XX11 in FIG. 21, centre

To counteract wear of the wetted surface of the locating member in use, a further alternative method is to move the locating member continuously in such a way as to cause the trailing edge of the molten body 5 to cling to different parts of the locating member in a cyclic fashion. One embodiment operating in this way is illustrated in FIGS. 21 and 22.

The wetted bar 6, instead of having a flat wetted face, has an outwardly convex part-cylindrical wetted face 48 the axis of which extends transversely of and parallel to the surface of the bath of molten metal. The complete assembly of the beam structure 10, the carrier 13 and the locating member 6 is mounted in bearings (not shown) at each end outwardly of the side walls of the tank structure for oscillatory rotation about an axis coinciding with the axis of the part-cylindrical face 48, this axis being indicated at 49, in FIG. 22.

In operation of the apparatus, the body 5 of molten material wets only one half or less of the total curved area of the part-cylindrical face 48, and the beam structure 10 is oscillated continuously about the axis 49 to cause the face 48 to move through an arc which has an extent at least equal to the width of the body 5. In this way the surface of the part-cylindrical face 48 which is wetted by the body 5 is changed continuously and wear of the entire face takes place substantially evenly. To compensate for such wear it is merely necessary to adjust the beam structure 10 vertically by means of adjustable external end supports.

Rotational oscillation of the beam structure 10 is effected by means of a gear sector 50 attached to the beam structure 10 at one end thereof and meshing with a pinion 51 which is driven by an oscillatory motor through a shaft 52 on which the pinion is fixed.

Figures 23, 24:
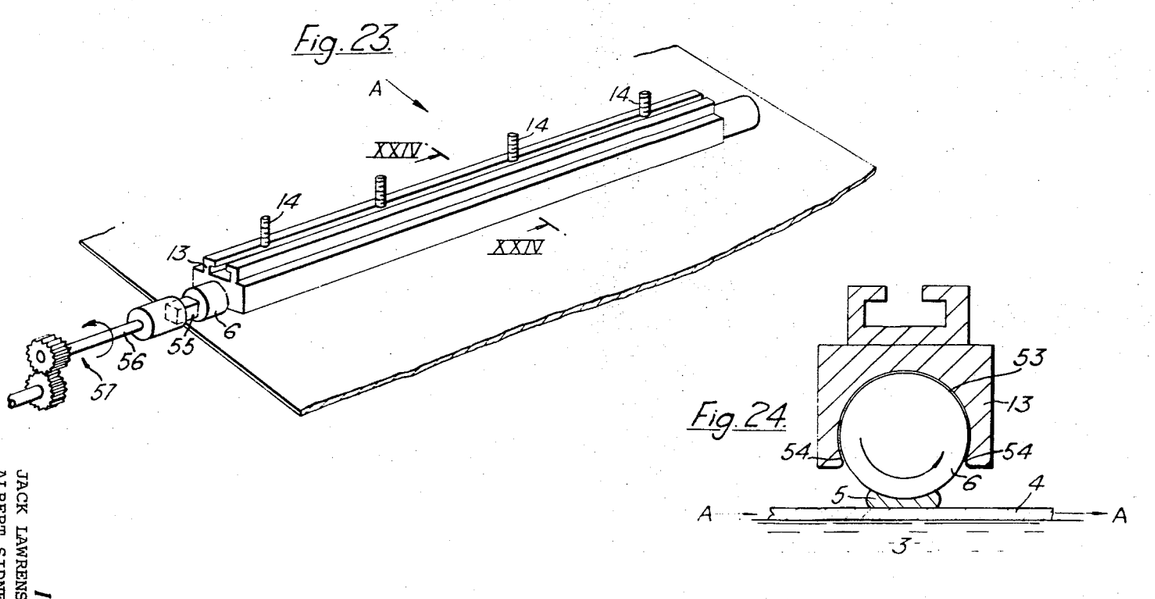
FIG. 23 is a view similar to FIG. 21 of another embodiment in which the locating member is a rotary member.
FIG. 24 is a section on line XX1V — XX1V of FIG. 23.

FIGS. 23 and 24 illustrate a modification of this arrangement in which the locating member 6 is a cylinder which is cradled in a part-cylindrical bore 53 in the carrier 13, and is supported on shoulders 54 at the open bottom of the bore 53. A stub 55 on one end of the cylindrical member 6 is keyed to a shaft 56 which is rotated continuously either clockwise or anticlockwise through a gear train 57 mounted externally of the tank structure. The drive is such that the member turns slowly in the support. Alternatively, the member 6 can be rotated intermittently to present a new surface to the body 5.

In this embodiment the wetted surface of cylindrical form of the locating member 6 to which the molten body clings is changed continuously, and any wear is distributed evenly over this surface, and the width of the molten body does not vary during operation of the process.

The invention is described thereinabove with particular reference to the treatment of glass in sheet or ribbon form, and is equally applicable to the treatment of glass articles, e.g., curved glass, pressed ware, or rolled glass sections.

The shape of the wetted surface of the locating member 6 and consequently of the body 5 clinging thereto may be modified to suit particular requirements. For example, the locating member 6 may have a width in the direction of relative movement A of the glass which varies in a predetermined manner across the glass ribbon when it is desired to produce a glass having shaded characteristics transversely of the glass.

We claim:

1. Float glass manufacturing apparatus comprising an elongated tank structure containing a bath of molten metal, means for advancing a ribbon of glass along the bath, a locating member extending across the tank structure just above the bath surface and having a lower face for locating a body of molten glass-modifying material on the upper surface of the advancing ribbon of glass, and wherein the downstream edge of the locating member comprises an adjustable edge portion defining a downstream portion of said lower face to which the downstream edge of the molten body clings, the edge portion being held by adjusting means for lowering the edge portion including said downstream portion of said lower face toward the molten body relative to an adjacent upstream portion of the lower face so as to renew the downstream portion of said lower face to which the molten body clings.

2. The apparatus according to claim 1 wherein:
said molten body comprises an electrically conductive body;
and further including electric current-generating means for enforcing migration of an element from said molten body into the advancing glass surface.

3. Float glass manufacturing apparatus comprising an elongated tank structure containing a bath of molten metal, means for advancing a ribbon of glass along the bath, a locating member extending across the tank structure just above the bath surface to locate a body of molten glass-modifying material on the upper surface of the advancing ribbon of glass, the downstream edge of the locating member comprising a continuous strip-shaped insert having a lower face to which the molten body clings, and strip-feeding means to advance said strip-shaped insert along the locating member.

4. The apparatus according to claim 3 wherein:
said molten body comprises an electrically conductive body;
and further including electric current-generating means for enforcing migration of an element from said molten body into the advancing glass surface.

5. Float glass manufacturing apparatus comprising an elongated tank structure containing a bath of molten metal, means for advancing a ribbon of glass along the bath, a locating member extending across the tank structure just above the bath surface to locate a body of molten glass-modifying material on the upper surface of the advancing ribbon of glass, and wherein the downstream edge of the locating member comprises a face of material to which the molten body clings, the downstream edge of the locating member comprising a continuous strip-shaped insert said insert being keyed into an elongated channel formed in said locating member adjacent said downstream edge, and strip-feeding means being located outside the tank structure to continuously feed the continuous strip of insert material through the channel at a controlled rate to renew continuously said face of said downstream edge.

6. The apparatus according to claim 5 wherein:
said molten body comprises an electrically conductive body;
and further including electric current-generating means for enforcing migration of an element from said molten body into the advancing glass surface.

7. A method of manufacturing float glass comprising the steps of:
providing an elongated tank structure containing a bath of molten metal;
advancing a ribbon of glass along the surface of said molten metal bath;
locating a body of molten glass-modifying material on the upper surface of the advancing ribbon of glass, by means of a locating member extending across the ribbon surface and having a lower face to which said molten body clings,
advancement of said ribbon of glass causing the downstream edge portion of the lower face of said locating member to erode at a more rapid rate than an adjacent upstream portion of the lower face;
enforcing migration of an element from said molten body into the advancing glass ribbon to impart surface characteristics to the glass ribbon;
and lowering the downstream edge portion of the lower face toward the molten body relative to the adjacent upstream portion of the lower face by an amount tending to compensate for said more rapid rate of erosion of said downstream edge portion.

8. The method according to claim 7 wherein said molten body comprises an electrically conductive body, and said step of enforcing further comprises: electronically enforcing a migration of an element from said molten body into the advancing glass surface.

9. A mehtod of manufacturing float glass comprising the steps of:
advancing a ribbon of glass along the surface of a molten metal bath contained in an elongated tank structure;
locating a body of molten glass-modifying material on the upper surface of the advancing ribbon of glass, by means of a locating member extending across the ribbon surface and having a lower face to which said molten body clings,
the downstream edge portion of said lower face being formed as a continuous strip-shaped insert mounted for movement along said locating member; and
advancement of said ribbon of glass causing said downstream edge portion of the lower face of said locating member to erode at a more rapid rate than an adjacent upstream portion of the lower face;
enforcing migration of an element from said molten body into the advancing glass ribbon to impart surface characteristics to the glass ribbon:
and advancing said strip-shaped insert along the locating member to cause advancement of the downstream edge portion of said lower face relative to the adjacent upstream portion of the lower face by an amount tending to compensate for said more rapid erosion of said downstream edge portion.

10. The method according to claim 9 wherein said molten body comprises an electrically conductive body, and said step of enforcing further comprises: electronically enforcing a migration of an element from said molten body into the advancing glass surface.

* * * * *